April 18, 1967 W. KELLER 3,315,156
METHOD FOR DETERMINING THE ELECTRICAL RESISTANCE
OF A BODY OF EXTREMELY PURE SEMICONDUCTOR
MATERIAL FOR ELECTRONIC PURPOSES
Filed Aug. 5, 1964

3,315,156
METHOD FOR DETERMINING THE ELECTRICAL RESISTANCE OF A BODY OF EXTREMELY PURE SEMICONDUCTOR MATERIAL FOR ELECTRONIC PURPOSES
Wolfgang Keller, Pretzfeld, Germany, assignor to Siemens-Schuckertwerke Aktiengesellschaft, Berlin-Siemensstadt, Germany, a corporation of Germany
Filed Aug. 5, 1964, Ser. No. 387,608
Claims priority, application Germany, Aug. 9, 1963, S 86,651
3 Claims. (Cl. 324—60)

The present invention relates to a method for determining the electrical resistance of extremely pure semiconductor material for electronic purposes.

According to a known method, the resistance is measured by the current or voltage conditions obtaining at resonance of a resonant circuit which is capacitatively coupled with the semiconductor body in at least two places. The resonant circuit is excited by a frequency slightly below resonance, and resonance is produced by changing the coupling capacity of the semiconductor body.

It is an object of the invention to improve this method to afford measuring the electric resistance of flat semiconductor bodies, such as wafers or discs.

According to the present invention, a semiconductor plate is placed in a gap between two opposite capacitor surfaces of a resonant circuit capacitor and the width of the gap is changed.

Figure 1:
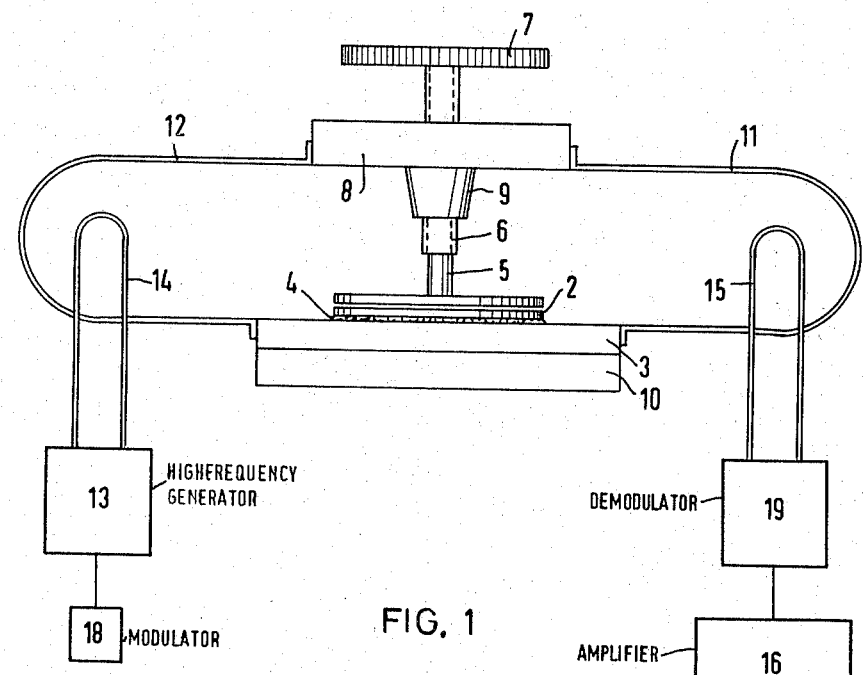
Figure 2:
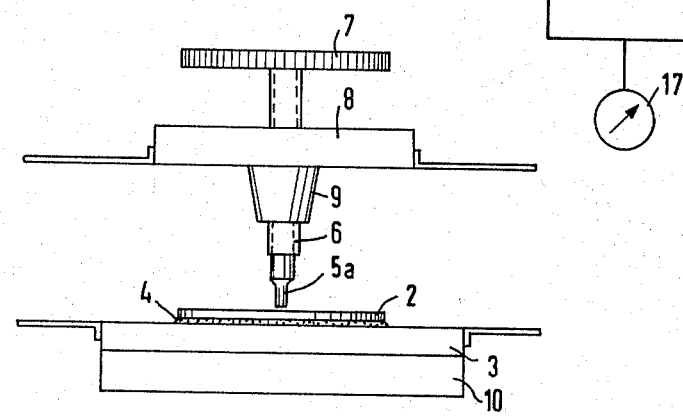

In order that the present invention may be readily carried into effect, it will now be described with reference to the accompanying drawing, wherein:

FIG. 1 is a side view, partly in block form, of an embodiment of the electrical resistance determining arrangement of the present invention; and FIG. 2 is a side view of part of a modification of the embodiment of FIG. 1.

In FIG. 1, an essentially monocrystalline semiconductor disc 2, for example of silicon, whose resistance is to be measured, is placed loosely upon a supporting plate 3 of metal which may consist of a silver-coated copper plate. By moistening or wetting the metal support 3 at the resting points, the space between the plate 2 and the support 3 is filled by a liquid film 4, such as a thin film of water, particularly distilled water. Water has a comparatively high dielectric constant. Of course, another liquid may be used, provided it has a similarly high dielectric constant, which adequately moistens the two mating surfaces of the plates 2 and 3 and closes or fills-in the opening or space completely.

A parallel metal plate 5 is positioned opposite to, and closely spaced from, the top face of the silicon disc 2. The plate 5 is affixed to a finely threaded shaft 6, which can be used to adjust the spacing between plate 5 and plates 2 and 3. The shaft 6 is equipped with an insulated knob 7, such as a knurled head. The threaded shaft 6 is engaged by an internally threaded mounting consisting of a metal plate 8 and a guide member 9. The plate 8 is securely connected to an insulated base plate 10 by a support structure, not indicated in the drawing. The supporting plate 3 is supported by the non-indicated support structure. The control member 6 is of substantially elongated configuration having spaced opposite ends and a threaded portion intermediate said ends. The plate 5 is affixed to one end of the control member 6 in substantially parallel relation to the plates 2 and 3, and the other end of the control member extends beyond the control plate 8 and is adjusted to be manually turned about its axis to move the plate 5 in relation to the plate 3.

As illustrated, the ends of two half loops of an electric conductor, for example, a 1 mm. thick and 2 cm. wide silver sheet are affixed to the preferably grounded support 3 and to the metal plate 8, so that parts 3, 11, 8 and 12 form a closed loop. The loop 3, 11, 8, 12 represents the inductivity of a resonant circuit whose capacitance is formed by a capacitor constituted by the opposing faces of the metal plate 5 and the silicon disc 2. The resistance of the silicon disc 2, which is to be measured, is in series with the capacitance or capacitive reactance and the inductance or inductive reactance.

The effect of the intermediate liquid film 4 is to eliminate possible disturbances, such as irregularities or foreign bodies, on the surface of the metal plate 3. These disturbances could otherwise act as error sources. Their elimination thus provides for accurately defined conditions on the lower electrode of the resonant circuit capacitor.

The alternating voltage is applied to the resonant circuit through a coupling coil 14, from a high-frequency generator 13. The measuring equipment is coupled to a second coupling coil 15. The measuring results are delivered to an indicating device 17 through an amplifier 16.

The equipment measures the total resistance of the silicon disc 2. Frequently, this value is already known by measuring the resistance of the rod from which the disc was cut. However, the method and apparatus of the invention afford measuring the resistance of individual parts of the disc. This is of considerable value in practice, since the resistance of such discs frequently increases in the direction radially outward from the center. This relates particularly to larger diameters of 25 to 40 mm. and more.

To determine the radial course of the specific resistance, the area of at least one of the plates of the capacitor is made small relative to the area of the adjacent face of the semiconductor plate. The upper plate 5 of the capacitor is preferably modified in size to approximately 2 mm. in diameter, as shown in FIG. 2. The size of the plate 5 is modified by providing the pin-shaped projection 5a, of the stated thickness, with an accurately planar lower face, the projection 5a serving as the upper electrode of the capacitor. Therefore, the resistance measured is limited to a small part of the semiconductor plate 2. Differences in individual, local resistance values can be determined on the plate surface through a series of measurements in which the semiconductor plate is shifted sideways, relative to the capacitor surfaces, between measuring processes.

It is advisable to perform this process with a resonance frequency of over 100 megacycles per second, particularly about 300 megacycles per second. This can be modulated with a low frequency, preferably 1000 cycles per second. For this purpose, as shown in FIG. 1, a modulator 18 on the transmitting end and a demodulator 19 on the receiving end, have been additionally provided.

The indicating device 17 indicates the high frequency voltage E of the tuned circuit, the measuring constant being represented by the coupling and amplifying factors.

In order to measure resistivity variations in discs it is also preferable that the ratio of the reactive impedance, resulting from inductance and capacitance, to the active resistance to be measured, be a minimum of 3, and particularly be larger than 5. Thus, the measuring indication attains proportionality within an adequately large resistance area, which encompasses the differences in the resistance values in the center as well as at the edge of the disc 2.

Instead of measuring only resistivity ratios the apparatus can also serve as a means to measure absolute resistivities. If $Q_1$ is the Q of the circuit tuned to resonance without disc 2, and $Q_2$ the Q of the circuit tuned to resonance with disc 2, then the basic formula $$Q_1/Q_2 = E_1/E_2$$

can be employed, where $E_1$ and $E_2$ are the radio-frequency voltages of the circuit tuned to resonance.
From $$Q_1 = \omega L/R_1 = 1/\omega C_1 R_1$$
$$Q_2 = \omega L/R_2 = 1/\omega C_2 R_2$$

one has
$$E_1/E_2 = R_1/R_2$$
where approximately $C_1 = C_2 = C$
hence $$R_2 = \frac{E_1}{E_2} R_1$$

$$R_2 = \frac{E_1}{E_2} \cdot \frac{\omega L}{Q_1} = \frac{E_1}{E_2} \frac{1}{\omega C Q_1}$$

It is also possible to calibrate the device by using discs of the desired geometrical dimensions and of known resistivity. The conductance of the plate 2, intended for measuring, may be read from the calibration curve, according to the deflections of the indicating device 17. The calibration curve is, of course, intended only for specific measurements of the individual parts of the resistance determining arrangement. Hence, a calibration curve established for the arrangement of FIG. 1 could not be used for the arrangement of FIG. 2 A special calibration curve would have to be established for the last-mentioned arrangement.

I claim:
1. Apparatus for determining the electrical resistance at desired localities of a body of semiconductor material having substantially large flat sides spaced from and positioned opposite each other, said apparatus comprising a resonant circuit arrangement having a resonant frequency, said resonant circuit arrangement comprising an inductance, a capacitance and a resistance, said capacitance comprising a pair of spaced capacitor plates, a surface of one of said pair of spaced capacitor plates being wetted with a liquid having a high dielectric constant, semiconductor material to be measured supported on the wetted surface of said one of said pair of capacitor plates between said plates and forming said resistance with said one of said plates, said one of said plates having a determined surface area, said semiconductor material being positioned in capacitive relation with the other of said plates and forming a capacitive reactance with said other of said plates in series circuit arrangement with said resistance, said other of said plates having a surface area opposing the surface area of said one of said plates which is considerably smaller than said determined surface area and considerably smaller than the area of a side of said semiconductor body;

means for exciting said resonant circuit arrangement at a frequency other than the resonant frequency of the said resonant circuit arrangement; and control means for varying the spacing between said plates to bring said resonant circuit arrangement to resonance whereby said resistance may be determined from one of the voltage and current at resonance.

2. Apparatus for determining the electrical resistance at desired localities of a body of semiconductor material having substantially large flat sides spaced from and positioned opposite each other, said apparatus comprising a resonant circuit arrangement having a resonant frequency, said resonant circuit arrangement comprising an inductance, a capacitance and a resistance, said capacitance comprising a pair of spaced capacitor plates, a surface of one of said pair of spaced capacitor plates being wetted with distilled water, semiconductor material to be measured supported on the wetted surface of said one of said pair of capacitor plates between said plates and forming said resistance with said one of said plates, said one of said plates having a determined surface area, said semiconductor material being positioned in capacitive relation with the other of said plates and forming a capacitive reactance with said other of said plates in series circuit arrangement with said resistance, said other of said plates having a surface area opposing the surface area of said one of said plates which is considerably smaller than said determined surface area and considerably smaller than the area of a side of said semiconductor body;

means for exciting said resonant circuit arrangement at a frequency other than the resonant frequency of the said resonant circuit arrangement; and control means for varying the spacing between said plates to bring said resonant circuit arrangement to resonance whereby said resistance may be determined from one of the voltage and current at resonance.

3. Apparatus for determining the electrical resistance at desired localities of a body of semiconductor material having substantially large flat sides spaced from and positioned opposite each other, said apparatus comprising a resonant circuit arrangement having a resonant frequency, said resonant circuit arrangement comprising an inductance, a capacitance and a resistance, said capacitance comprising a pair of spaced capacitor plates, one of said pair of plates having a surface of determined area and the opposing surface of the other of said pair of plates having an area smaller than that of said one of said pair of plates, a surface of one of said pair of spaced capacitor plates being wetted with distilled water, semiconductor material to be measured supported on the wetted surface of said one of said pair of plates between said plates and forming said resistance with said one of said plates, said opposing surface of said other of said plates having an area which is smaller than the area of a side of said semiconductor body, said semiconductor material being positioned in capacitive relation with the other of said plates and forming a capacitive reactance with said other of said plates in series circuit arrangement with said resistance, said semiconductor body being laterally displaceable in the spacing between said plates relative to said spacing;

means for exciting said resonant circuit arrangement at a frequency other than the resonant frequency of the said resonant circuit arrangement; and control means for varying the spacing between said plates to bring said resonant circuit arrangement to resonance whereby said resistance may be determined from one of the voltage and current at resonance.

References Cited by the Examiner

UNITED STATES PATENTS

| | | | |
|---|---|---|---|
| 1,960,168 | 5/1934 | Schoenberg | 324—60 X |
| 1,976,904 | 10/1934 | Terman | 324—62 X |
| 2,358,462 | 9/1944 | Mahren | 324—58 |
| 2,567,587 | 9/1951 | Wilchinsky | 324—60 |
| 2,603,754 | 7/1952 | Hansen | 250—39 |
| 2,614,153 | 10/1952 | Carniol | 324—81 X |
| 2,939,073 | 5/1960 | Eul | 324—40 X |

OTHER REFERENCES

Reynolds et al., Review of Scientific Instruments, "Air-Gap Test Cell," vol. 29, No. 4, April 1958, pp. 295–296.

Revesz, "Design and Applications of a Capacitive Measuring System," Electronic Equipment, February 1956, pp. 18–23.

Weingarten et al., "Radio-Frequency Carrier—Measurements on Silicon," J. of the Electrochemical Society, February 1961, vol. 108, No. 2, pp. 167–171.

WALTER L. CARLSON, *Primary Examiner.*

RUDOLPH V. ROLINEC, *Examiner.*

E. E. KUBASIEWICZ, *Assistant Examiner.*